(12) United States Patent
Doetsch et al.

(10) Patent No.: US 7,295,625 B2
(45) Date of Patent: Nov. 13, 2007

(54) METHOD AND DEVICE FOR DIVERSITY TRANSMISSION OF CODED INFORMATION

(75) Inventors: Markus Doetsch, Schliern (CH); Peter Jung, Otterberg (DE); Jörg Plechinger, München (DE); Peter Schmidt, Ellerstadt (DE); Michael Schneider, München (DE); Tideya Kella, München (DE)

(73) Assignee: Infineon Technologies AG, Munich (DE)

(*) Notice: Subject to any disclaimer, the term of this patent is extended or adjusted under 35 U.S.C. 154(b) by 658 days.

(21) Appl. No.: 10/347,540

(22) Filed: Jan. 17, 2003

(65) Prior Publication Data

US 2003/0135799 A1    Jul. 17, 2003

Related U.S. Application Data

(63) Continuation of application No. PCT/DE01/02465, filed on Jun. 29, 2001.

(30) Foreign Application Priority Data

Jul. 17, 2000    (DE) ................. 100 34 714

(51) Int. Cl.
H04B 7/02    (2006.01)
(52) U.S. Cl. .................................... 375/267
(58) Field of Classification Search ............. 375/267, 375/299, 146, 295, 260; 370/208, 320, 335, 370/352; 455/500, 101, 102, 103
See application file for complete search history.

(56) References Cited

U.S. PATENT DOCUMENTS 5,978,365 A     11/1999  Yi
6,304,581 B1 *  10/2001  Chen et al. ............. 370/479
6,370,669 B1 *   4/2002  Eroz et al. .............. 714/774
6,400,703 B1 *   6/2002  Park et al. .............. 370/342
6,473,442 B1 *  10/2002  Lundsjo et al. ......... 370/537
6,542,736 B1 *   4/2003  Parkvall et al. ........ 455/452.2
6,545,983 B2 *   4/2003  Belaiche ................. 370/252

(Continued)

FOREIGN PATENT DOCUMENTS

WO     97/45976       12/1997
WO     00/36783        6/2000
WO     01/54303 A1    7/2001

OTHER PUBLICATIONS

Berrou, C. et al.: "Near Shannon Limit Error-Correcting Coding and Decoding: Turbo-Codes (1)", IEEE, 1993, pp. 1064-1070.

(Continued)

Primary Examiner—Khanh C. Tran
Assistant Examiner—Sam K. Ahn
(74) Attorney, Agent, or Firm—Laurence A. Greenberg; Werner H. Stemer; Ralph E. Locher

(57) ABSTRACT

A transmit signal is generated with N antenna data signals for emission via N transmitting antennas. A useful data signal X is subjected to channel coding to generated the transmit signal. On the signal path between channel coding and the emission via the transmitting antennas, data rate matching is performed by way of a data rate matching stage which makes it possible that the number N of the transmitting antennas can be predetermined independently of the code rate.

20 Claims, 2 Drawing Sheets

U.S. PATENT DOCUMENTS

| | | | |
|---|---|---|---|
| 6,560,295 B1 * | 5/2003 | Hammons et al. | 375/299 |
| 6,731,696 B1 * | 5/2004 | Gelblum et al. | 375/322 |
| 6,751,772 B1 * | 6/2004 | Kim et al. | 714/786 |
| 6,804,307 B1 * | 10/2004 | Popovic | 375/299 |

OTHER PUBLICATIONS

Van Wyk, D. J. et al.: "Turbo-Coded/Multi-Antenna Diversity Combining Scheme for DS/CDMA Systems", IEEE, 1998, pp. 18-22.

Van Wyk, D. J. et al.: "Fading Correlation and its Effect on the Capacity of Space-Time Turbo Coded DS/CDMA Systems", Milcom 1999, IEEE Military Communications Conference Proceedings, Atlantic City, NJ, Oct. 31-Nov. 3, 1999, IEEE Military Communications Conference, New York, NY: IEEE, US, vol. 1 of 2 CONF. 18, Oct. 31, 1999, pp. 538-542.

Stefanov, A. et al.: "Turbo Coded Modulation for Wireless Communications with Antenna Diversity", IEEE, 1999, pp. 1565-1569.

* cited by examiner

METHOD AND DEVICE FOR DIVERSITY TRANSMISSION OF CODED INFORMATION

CROSS-REFERENCE TO RELATED APPLICATION

This application is a continuation of copending International Application No. PCT/DE01/02465, filed Jun. 29, 2001, which designated the United States and was not published in English.

BACKGROUND OF THE INVENTION

Field of the Invention

The invention lies in the telecommunications field. More specifically, the invention pertains to a method and a device for generating a transmission signal, which comprises a number of antenna data signals provided for emission via in each case one transmitting antenna, and wherein the useful data signal is subjected to channel coding. The device generates from a useful data signal a transmit signal for emission via a plurality of antenna data signals each for emission via a respective transmitting antenna.

In mobile radio systems, the quality of transmission is influenced by time variance and frequency selectivity of the mobile radio channel and by time-variable multiple access interference. As a rule, digital mobile radio systems use several types of diversity for improving the system behavior. Known measures for utilizing the frequency diversity of the mobile radio channel are the use of a CDMA or TDMA component in multiple access. The time diversity of the channel is usually utilized by channel decoding and interleaving the data signal to be transmitted. A further type of diversity is space diversity. In space diversity, a distinction is made between antenna diversity, directional diversity and polarization diversity.

In the text which follows, antenna diversity is considered. Antenna diversity can be used because the state of the mobile radio channel differs for different sites of the mobile stations and base stations. In antenna diversity, a distinction is made between the case where a number of receiving antennas are used (receiver antenna diversity) and the case where a number of transmitting antennas are used (transmitter antenna diversity) and both possibilities can also occur combination. Whereas receiver antenna diversity is well understood from the theoretical point of view and is widely used in practice, the concept of transmitter antenna diversity has hitherto been researched less well.

Special turbo codes designed for transmitter antenna diversity have already been proposed. In these codes, the number of transmit data streams for the transmitting antennas are already generated during the coding. This procedure can be called antenna diversity coding.

The disadvantageous factor in this concept is that the number of transmitting antennas needed depends on the code rate $R_c=k/n$. The code rate $R_c$ is the quotient of a number k of input data symbols and a number n of output data symbols (referred to the k input data symbols) of the coder. In the case of a code rate of, say, $R_c=\frac{1}{2}$, two transmitting antennas must be used whereas a code rate of $R_c=\frac{1}{3}$ requires a number of three transmitting antennas. If a variable service-dependent code rate is possible and provided, as in the UMTS (Universal Mobile Telecommunications System) standard, the method of antenna diversity coding is not feasible because every service (e.g. voice, video) needs a different number of transmitting antennas.

In the article "Fading Correlation and its Effect on the Capacity of Space-Time Turbo-Coded DS/CDMA Systems" by D. J. Wyk et al., Milcom 1999, IEEE Military Communications Conference Proceedings, Atlantic City, N.J., Oct. 31-Nov. 3, 1999, IEEE Military Communications Conference, New York, N.Y.: IEEE, US, Vol. 1 of 2 CONF. 18, Oct. 31, 1999, pages 538-42, a method and a device for antenna diversity coding for M transmitting antennas are described. A turbo coder performs coding with a code rate of 1/(M+1) and generates M+1 data streams. These are transformed by means of a puncturing device and multiplexer into M data streams which are subsequently emitted via the M transmitting antennas.

International publication Nr. WO 00/36783 describes a transmitting system comprising a number of two transmitting antennas. If the channel coder has a code rate of less than ½, data rate matching is performed by way of a puncturing unit.

SUMMARY OF THE INVENTION

It is accordingly an object of the invention to provide a method which facilitates the implementation of mobile radio transmitters which use transmitter antenna diversity, which overcomes the above-mentioned disadvantages of the heretofore-known devices and methods of this general type and which, in particular, meets the requirements for transmitting different services. It is a further object of the invention to provide a device for transmitter antenna diversity transmission having these characteristics.

With the foregoing and other objects in view there is provided, in accordance with the invention, a method of generating a transmit signal from a useful data signal, the transmit signal comprising a number of antenna data signals each to be emitted via one of a fixed number of transmitting antennas, the method which comprises:

setting a variable code rate to a given code rate for channel coding;

channel coding the useful data signal with the given code rate;

defining a rate matching ratio as a quotient of an input rate to an output rate on a signal path between the channel coding and an emission of the antenna data signals via the transmitting antennas; and data rate matching with the rate matching ratio defined by the quotient of the input rate to the output rate, with the rate matching ratio dependent on the given code rate.

With the above and other objects in view there is also provided, in accordance with the invention, a method of generating a transmit signal from a useful data signal, the transmit signal comprising a number of antenna data signals each to be emitted via a transmitting antenna, the method which comprises:

selecting a number of transmitting antennas from a variably predeterminable number of transmitting antennas;

channel coding the useful data signal with a fixed code rate; and data rate matching with a variable rate matching ratio defined by a quotient of input rate to output rate on a signal path between the channel coding and an emission of the antenna data signals via the transmitting antennas, the rate matching ratio being dependent on the number of selected transmitting antennas.

Also, with the above and other objects in view there is also provided, in accordance with the invention, a device for generating a transmit signal from a useful data signal, the transmit signal comprising a plurality of antenna data signals each to be emitted via a respective transmitting antenna, comprising:

a channel coder with variably adjustable code rate and having an input receiving the useful data signal;

a fixed predetermined number of transmitting antennas each for emitting one of the antenna data signals; and a data rate matching stage connecting in between the channel coder and the transmitting antennas, the data rate matching stage performing a data rate matching with a rate matching ratio defined by a quotient of an input rate to an output rate, the rate matching ratio being dependent on the code rate set in the channel coder.

Due to the data rate matching used in the signal path between the channel coding and the transmitting antennas, a decoupling of the quantities N (number of transmitting antennas) and $R_c$ (code rate of channel coder) is achieved. This makes it possible to distribute the data symbols of the coded useful data signal to an arbitrary but fixed number N of transmitting antennas independently of the code rate $R_c$ used. From the production point of view, this already provides the advantage, even with a fixed code rate $R_c$, that the number N of transmitting antennas is not mandatorily prescribed by a software-determined quantity (the code rate $R_c$) which is still unknown in many cases during the production of the transmitter (for example of a mobile telephone). From the point of view that modern mobile radio systems must be suitable for transmitting a multiplicity of services with different demands on the channel coding, the advantage is obtained that the number of transmitting antennas can be constant even with a variable code rate $R_c$.

For the data rate matching, puncturing and/or repetitive coding of data symbols of the coded useful data signal can be provided in a preferred manner.

In accordance with an advantageous feature of the invention, the coded useful data signal is demultiplexed and/or interleaved in the signal path between the channel coding and the emission of the antenna data signals via the transmitting antennas. If necessary, these measures make it possible to control in a suitable manner the distribution of the coded useful data signal to the N transmit data streams to be emitted and to improve the transmission characteristics of the signal to be transmitted.

A particularly effective form of coding, which can also be done with a variable code rate, is implemented by turbo coding. In this case, a suitable variant of the embodiment of the invention is wherein in the turbo coding, a systematic data signal, a redundant data signal and an interleaved redundant data signal are generated, in that three mixed data signals with unchanged data rate are generated from these three data signals by distributing the data symbols among each other, and in that the predetermined number of N antenna data signals is generated by puncturing all three mixed data signals and then multiplexing if N<3, or by repeating data symbols of the three mixed data signals and then demultiplexing if N>3.

Other features which are considered as characteristic for the invention are set forth in the appended claims.

Although the invention is illustrated and described herein as embodied in a method and device for diversity transmission of coded information, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
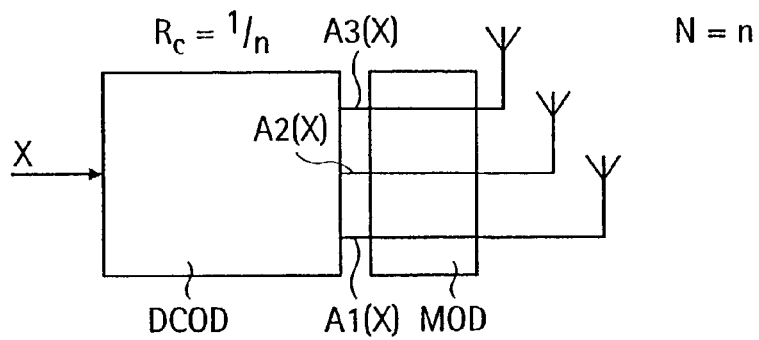
FIG. 1 is a simplified block diagram of a device for generating N antenna data signals according to the prior art.

Referring now to the figures of the drawing in detail and first, particularly, to FIG. 1 thereof, there is shown FIG. 1 shows a device, recently proposed, for generating a transmit data signal utilizing transmitter antenna diversity. A useful data signal X is supplied to a diversity channel coder DCOD. The useful data signal X consists of a sequence of data symbols, $X=(x_1, x_2, \ldots)$, for example bits. The diversity channel coder DCOD performs channel coding with the code rate $R_c=1/n$. This means that n−1 redundant data symbols are added to each data symbol of the useful data signal X. In the example shown, n=3. At the output of the diversity channel coder DCOD, a transmit signal is available which consists of n=3 antenna data signals A1(X), A2(X) and A3(X) of in each case the same data rate. Overall, the adding of redundancy in the diversity channel coder DCOD increases the data rate of the transmit signal (consisting of three antenna data signals) by a factor of 3 in comparison with the data rate of the useful data signal X. The antenna data signals A1(X), A2(X) and A3(X) have a structure which is firmly predefined by the scheme of redundancy insertion used during the coding. After modulation in a modulator MOD, they are emitted via N=n=3 transmitting antennas.

Figure 2:
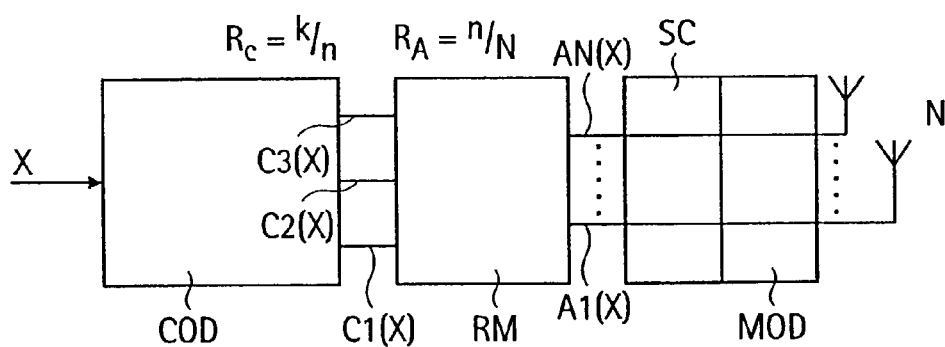
FIG. 2 is a simplified block diagram for explaining the generation according to the invention of a predeterminable number of N antenna data signals.

In the invention, the useful data signal X is also subjected to coding by a channel coder COD, according to FIG. 2. The channel coder COD generates a coded useful data signal which is provided, for example, in the form of a number of data streams C1(X), C2(X) and C3(X) or multiplexed as a single useful data symbol C(X), see FIG. 3. Compared with the useful data signal X supplied at the input, the data rate of the coded useful data signal C1(X), C2(X) and C3(X) or, respectively, C(X) is increased by the factor of the code rate $R_c=k/n$.

According to the invention, the coded useful data signal is supplied to a data rate matching stage RM. The data rate matching stage converts the coded useful data signal (or, respectively, the individual coded data streams C1(X), C2(X) and C3(X)) into a transmit signal which is suitable for emission via a predetermined number N of transmitting antennas (in FIG. 2, N=2 antennas are shown). The number N can be arbitrarily predetermined. The data rate matching is done with a matching rate $R_A=n/N$, n being the number of data symbols arriving at RM and N being the number of data symbols then output by RM.

For transmit signal output via the data rate matching stage RM, which, as shown in FIG. 2, already consists either of N antenna data signals A1(X), . . . , AN(X) or is divided into the correct number of antenna data signals in a later multiplexing or demultiplexing step, is subjected to spread-spectrum coding in a spread-spectrum coder SC, suitably modulated onto a carrier in a modulator MOD and emitted via the N transmitting antennas. The spread-spectrum coding can be, for example, DS CDMA (Direct Sequence Code Division Multiple Access) wherein a key in the form of a subscriber-specific code is impressed on each data symbol.

The data rate matching of the coded useful data signal to the constructionally predetermined requirements (N transmitting antennas in the transmitter), according to the invention, makes it possible to utilize transmitter antenna diversity for transmitting different services. Different services are usually transmitted with different code rates Rc in order to implement "economical" coding if possible, which just meets the service-related requirements for the bit error rate in the receiver. Setting a data rate of the transmit signal which is matched to the code rate $R_c$ with respect to the predetermined number of antennas N makes it possible to emit any services via the fixed number of N transmitting antennas by utilizing transmitter antenna diversity.

In contrast, a separate diversity channel code would have to be provided for each service to be transmitted according to the prior art (FIG. 1) and, moreover, the number of transmitting antennas would have to be adjusted in accordance with the code rate of the respective diversity channel code. Either one would present considerable problems in practice.

Figure 3:
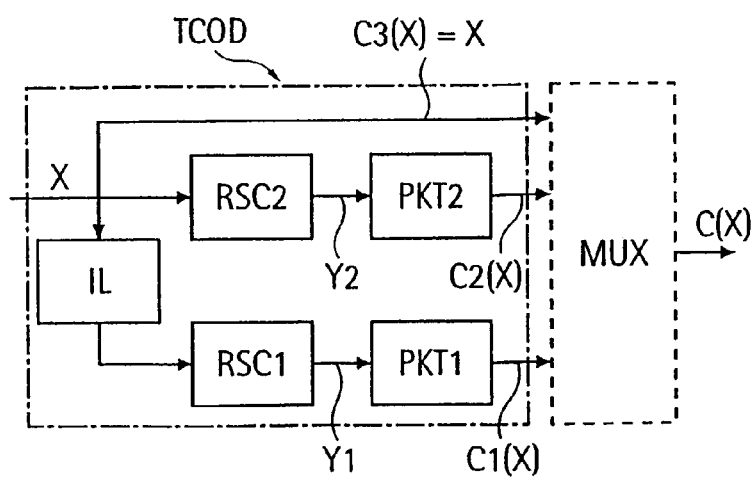
FIG. 3 is a circuit diagram for explaining the structure of a turbo coder.

A turbo coder is preferably used for the channel coding according to the invention. FIG. 3 shows a possible structure of a turbo coder TCOD in the form of a block diagram.

The turbo coder TCOD has two identical, binary, recursive, systematic convolutional coders RSC1 and RSC2 known as RSC in coding technology. The input of the first RSC convolutional coder RSC1 is preceded by a turbo code interleaver IL which interleaves the useful data signal X block by block. The outputs of the two convolutional coders RSC1 and RSC2 are in each case connected to optional puncturing devices PKT1 and PKT2, respectively. In the case of TCOD, the three coded data streams C1(X), C2(X) and C3(X) of the coder COD shown in FIG. 2 are implemented by the two outputs of the puncturing devices PKT1, PKT2 and by the useful data signal X.

At their outputs, the first convolutional coder RSC1 provides a first interleaved redundant data sequence Y1= $(y1_1, y1_2, \ldots)$ and the second convolutional coder RSC2 provides a second redundant data sequence Y2=$(y2_1, y2_2, \ldots)$. For each useful data symbol $x_i$, a redundant data symbol $y1_i$ and $y2_i$, respectively, is generated in each convolutional coder, where i is the interval considered, i.e. i=1, 2, . . . .

A first possibility for performing the turbo coding consists in omitting the puncturing devices PKT1 and PKT2 drawn in FIG. 3. In this case, C1(X)=Y1, C2(X)=Y2 and C3(X)=X. The code rate of TCOD is $R_c=\frac{1}{3}$.

The coded useful data signal does not need to be output by the turbo coder TCOD in the form of three individual signals C1(X), C2(X) and C3(X), but can be converted into a single coded useful data signal C(X) by multiplexing these data signals, as already mentioned. Multiplexing by means of the multiplexer MUX shown in FIG. 3 can be carried out, for example, in accordance with the following rule C=$(x_1, y2_1, y1_1, x_2, y2_2, y1_2, x_3, y2_3, y1_3, \ldots)$ The puncturing devices PKT1, PKT2 are used for variably adjusting the code rate of the turbo coder TCOD. If the turbo coder TCOD has a code rate of $R_c=\frac{1}{2}$, the two redundant part-sequences Y1 and Y2 are punctured, for example, in alternation and are first multiplexed in the multiplexer MUX. The resultant redundant data sequence Y=$(y1_1, y2_2, y1_3, y2_4, \ldots)$ is then multiplexed with the systematic data sequence X in alternation—also still in the multiplexer MUX. The error-protection coded useful data signal produced with this (special) form of turbo coding accordingly has the form C(X)=$(x_1, y1_1, x_2, y2_2, x_3, y1_3, x_4, y2_4, \ldots)$.

If the coder COD has a variable code rate $R_c$ (which can be achieved by adding or bypassing the puncturing devices PKT1, PKT2 as explained in the example shown in FIG. 3), the data rate matching stage RM is informed of the current code rate $R_c$ so that the data rate can be correspondingly matched for generating a transmit signal suitable for the fixed number N.

Figure 4:
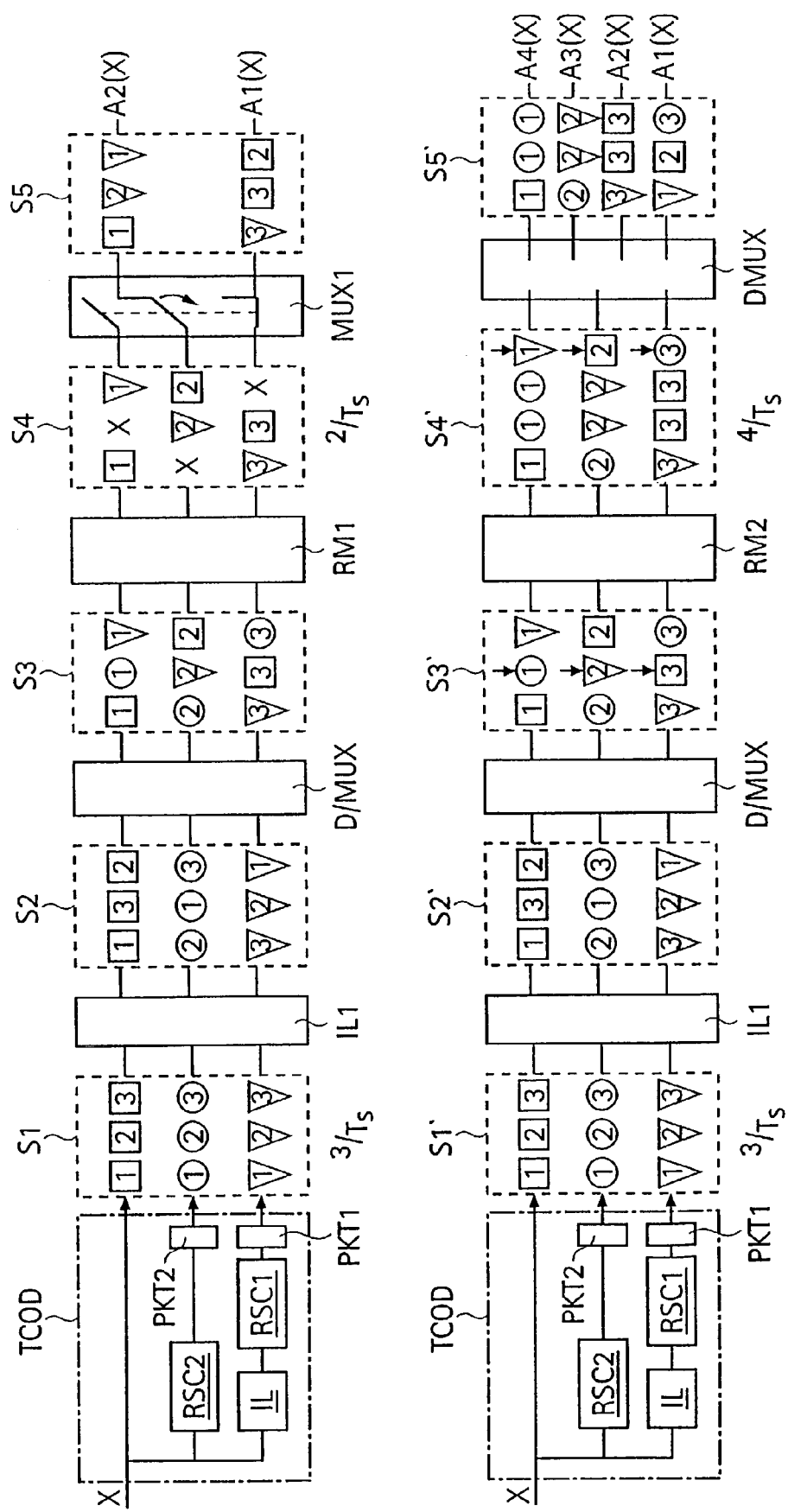
FIG. 4 is a diagrammatic representation in the form of a combined block diagram and data signal diagram for explaining two variants of the device according to the invention.

Apart from data rate matching, the coded useful data signal can be interleaved and/or multiplexed/demultiplexed for distributing the data symbols to the N antenna signals A1(X), . . . , AN(X) in the signal path between the channel coder COD and the modulator MOD. FIG. 4 shows suitable arrangements for the interleaving, the demultiplexing/multiplexing and the rate matching of the coded useful data signal for two examples, namely N=2 and N=4.

Both examples are based on the turbo coder TCOD shown in FIG. 3, with a code rate $R_c=\frac{1}{3}$. The two puncturing devices PKT1 and PKT2 are thus deactivated.

The signal processing steps performed on the signal path after the turbo coder TCOD are explained by means of diagrams S1 to S5 (for N=2) and S1' to S5' (for N=4) in FIG. 4. In diagram S1, in each case three data symbols, following one another in time, of the outputs C1(X), C2(X) and C3(X) of the turbo coder TCOD are shown graphically. To distinguish between data symbols from different outputs, squares and circles and triangles are used, respectively. The numbers in these graphical elements designate the intervals i=1, 2, 3. The data rate at the output of the turbo coder TCOD is $3/T_s$, where $T_s$ is the symbol period.

An interleaver IL1 is located in the signal path following the turbo coder TCOD. The interleaver IL1 performs a permutation of the data symbols for each data stream obtained. The result is, on the one hand, that previously adjacent data symbols are spaced apart in time. On the other hand, a suitable choice of the permutation rules, which differ with respect to C1(X), C2(X) and C3(X), also makes it possible that data symbols coming from different intervals now occur in the three data streams in each interval, see diagram S2.

After that, the data symbols of the three data streams are distributed among each other. This data processing step can be performed by means of a combined demultiplexer/multiplexer device D/MUX. After the combined demultiplexer/multiplexer device D/MUX, the data symbols occurring in a particular interval at the outputs of the turbo coder TCOD are lined up in each data stream, see diagram S3.

A first data rate matching stage RM1 operates as puncturing device. In each time interval, precisely one data symbol is punctured from the three parallel data streams and the puncturing is cyclic with respect to the data streams. Accordingly, one data symbol is punctured from three data symbols in each data stream. The punctured data symbol is discarded and is shown by a cross in diagram S4. At the output of the first data rate matching stage RM1, the data rate is $2/T_s$.

On the signal path following the first data rate matching stage RM1, a multiplexer MUX1 is located which provides the correct number of antenna data signals. In the present example, the transmit signal comprises two antenna data signals A1(X) and A2(X). The two antenna data signals A1(X) and A2(X) are generated in such a manner that the multiplexer MUX1 alternately distributes the data symbols input at its center input to the first antenna data signal A1(X) and the second antenna data signal A2(X), see diagram S5.

In the second example (lower part of FIG. 4), the case N=4 is considered. The operation of the turbo coder TCOD, of the interleaver IL1 and of the combined demultiplexer/multiplexer device D/MUX is identical to the operation of the corresponding components in the first example. As such, the data streams shown in diagrams S1 and S1' and S2 and S2' and S3 and S3', respectively, are identical.

The data rate is increased by a second data rate matching stage RM2. The data rate is increased by repetitive coding. In this method, the data symbol occurring in a particular interval identical for all data streams is repeated in each case in each data stream. The data symbols to be replicated are marked by an arrow in diagram S3'. The result of the repetitive coding of the individual data streams is shown in diagram S4'. The data rate at the output of the second data rate matching stage RM2 is $4/T_s$.

On the signal path following the second data rate matching stage RM2, a demultiplexer DMUX is arranged. The demultiplexer DMUX receives the data signals of the three data streams output by the data rate matching stage RM2 and provides four antenna data signals A1(X), A2(X), A3(X) and A4(X) at its output. The first antenna data signal A1(X) is formed from the data symbols present in the input data streams of the demultiplexer DEMUX in a particular interval identical for all data streams. The corresponding data symbols are marked by an arrow in diagram S4'. By comparison, the antenna data signals A2(X) to A4(X) are formed from in each case three data symbols, occurring adjacently in time, of the three input data streams. As can be seen from diagram S5', A2(X) follows from the data stream drawn at the bottom in FIG. 4, A3(X) results from the center data stream and A4(X) is formed from the data stream shown at the top.

The further signal processing of the two or, respectively, four antenna data signals of FIG. 4 takes place analogously to FIG. 2, i.e. the data signals are spread-spectrum coded, modulated onto a carrier and emitted via two antennas (first example) or, respectively, four antennas (second example).

To receive the data signals emitted, both one or a number of transmitting antennas can be used in the receiver. To decode the signals, MAP (Maximum A Posteriori) decoders or else SOVA (Soft Output Viterbi Algorithm) decoders can be used.

We claim:

1. A method of generating a transmit signal from a useful data signal, the transmit signal comprising a number of antenna data signals each to be emitted via one of a fixed number of transmitting antennas, the method which comprises:

setting a variable code rate to a given code rate for channel coding;

channel coding the useful data signal with the given code rate; and data rate matching with a variable rate matching ratio defined by a quotient of an input rate to an output rate on a signal path between the channel coding and an emission of the antenna data signals via the transmitting antennas, with the variable rate matching ratio dependent only on the given code rate.

2. The method according to claim 1, wherein the data rate matching step comprises one of puncturing and repeating data symbols of the coded data signal.

3. The method according to claim 1, which further comprises demultiplexing the coded data signal in the signal path between the channel coding and the emission of the antenna data signals via the transmitting antennas.

4. The method according to claim 1, which further comprises interleaving the coded data signal in the signal path between the channel coding and the emission via the transmitting antennas.

5. The method according to claim 1, wherein the channel coding step comprises turbo coding the useful data signal.

6. A method of generating a transmit signal from a useful data signal, the transmit signal including a number of antenna data signals each to be emitted via one of a fixed number of transmitting antennas, the method which comprises:

setting a variable code rate to a given code rate for channel coding;

channel coding the useful data signal with the given code rate, including turbo coding the useful data signal to generate three data signals including a systematic data signal, a redundant data signal, and an interleaved redundant data signal;

data rate matching with a variable rate matching ratio defined by a quotient of an input rate to an output rate on a signal path between the channel coding and an emission of the antenna data signals via the transmitting antennas, with the variable rate matching ratio dependent on the given code rate;

generating three mixed data signals with unchanged data rate from the three data signals by distributing data symbols among each other; and if the number N of transmitting antennas is less than three, generating N antenna data signals by puncturing the three mixed data signals and subsequently multiplexing; or if the number N of transmitting antennas is greater than three, repeating data symbols of the three mixed data signals and subsequently demultiplexing, wherein N is an integer.

7. The method according to claim 1, wherein the transmit signal is subjected to CDMA spread-spectrum coding.

8. A method of generating a transmit signal from a useful data signal, the transmit signal comprising a number of antenna data signals each to be emitted via a transmitting antenna, the method which comprises:

selecting a number of transmitting antennas from a variably predeterminable number of transmitting antennas;

channel coding the useful data signal with a fixed code rate; and data rate matching with a variable rate matching ratio defined by a quotient of input rate to output rate on a signal path between the channel coding and an emission of the antenna data signals via the transmitting antennas, the variable rate matching ratio being dependent on the number of selected transmitting antennas.

9. The method according to claim 8, wherein the data rate matching step comprises one of puncturing and repeating data symbols of the coded data signal.

10. The method according to claim 8, which further comprises demultiplexing the coded data signal in the signal path between the channel coding and the emission of the antenna data signals via the transmitting antennas.

11. The method according to claim 8, which further comprises interleaving the coded data signal in the signal path between the channel coding and the emission via the transmitting antennas.

12. The method according to claim 8, wherein the channel coding step comprises turbo coding the useful data signal.

13. The method according to claim 12, which comprises:
in the turbo coding process, generating three data signals including a systematic data signal, a redundant data signal, and an interleaved redundant data signal;
generating three mixed data signals with unchanged data rate from the three data signals by distributing data symbols among each other; and
if the number N of transmitting antennas is less than three, generating N antenna data signals by puncturing the three mixed data signals and subsequently multiplexing;
if the number N of transmitting antennas is greater than three, repeating data symbols of the three mixed data signals and subsequently demultiplexing, wherein N is an integer.

14. The method according to claim 8, which comprises subjecting the transmit signal to CDNIA spread-spectrum coding.

15. A device for generating a transmit signal from a useful data signal, the transmit signal comprising a plurality of antenna data signals each to be emitted via a respective transmitting antenna, comprising:
a channel coder with variably adjustable code rate and having an input receiving the useful data signal;
a fixed predetermined number of transmitting antennas each for emitting one of the plurality of antenna data signals; and
a data rate matching stage with a variable rate matching ratio connecting in between said channel coder and said fixed predetermined number of transmitting antennas, said data rate matching stage performing a data rate matching with the variable rate matching ratio defined by a quotient of an input rate to an output rate, the variable rate matching ratio being dependent only on the variably adjustable code rate set in said channel coder.

16. The device according to claim 15, wherein said data rate matching stage comprises at least one of a puncturing device and a device for repeating data symbols of the coded data signal.

17. The device according to claim 15, which further comprises at least one of a multiplexer and a demultiplexer connecting in a signal path between said data rate matching stage and said transmitting antennas.

18. The device according to claim 15, wherein said channel coder is a turbo coder.

19. A device for generating a transmit signal from a useful data signal, the transmit signal including a plurality of antenna data signals each to be emitted via a respective transmitting antenna, comprising:
a channel coder with variably adjustable code rate and having an input receiving the useful data signal, said channel coder being a turbo coder configured to generate three mixed data signals of a systematic data signal, a redundant data signal, and an interleaved redundant data signal;
a fixed predetermined number of transmitting antennas each for emitting a respective one of the plurality of antenna data signals;
a data rate matching stage with a variable rate matching ratio connecting in between said channel coder and said fixed predetermined number of transmitting antennas, said data rate matching stage performing a data rate matching with the variable rate matching ratio defined by a quotient of an input rate to an output rate, the variable rate matching ratio being dependent on the variably adjustable code rate set in said channel coder;
a data symbol distributing device, by distributing the data symbols among each other, generates three mixed data signals with unchanged data rate from the three mixed data signals; and
if N<3, said data rate matching stage generates a predetermined number of N antenna data signals by puncturing the three mixed data signals and subsequent multiplexing; or
if N>3, said data rate matching stage generates the predetermined number of N antenna data signals by repeating data symbols of all said three mixed data signals and subsequent demultiplexing, wherein N is an integer.

20. The method according to claim 15, which comprises a CDMA spread-spectrum coder for subjecting the transmit signal to CDMA spread-spectrum coding.

* * * * *